Aug. 21, 1956　　　F. M. BRAWAND　　　2,759,234
BUTT CHAIN ASSEMBLY WITH MEANS FOR PREVENTING
ACCIDENTAL DETACHMENT THEREOF
Filed June 24, 1955　　　　　　　　2 Sheets-Sheet 2
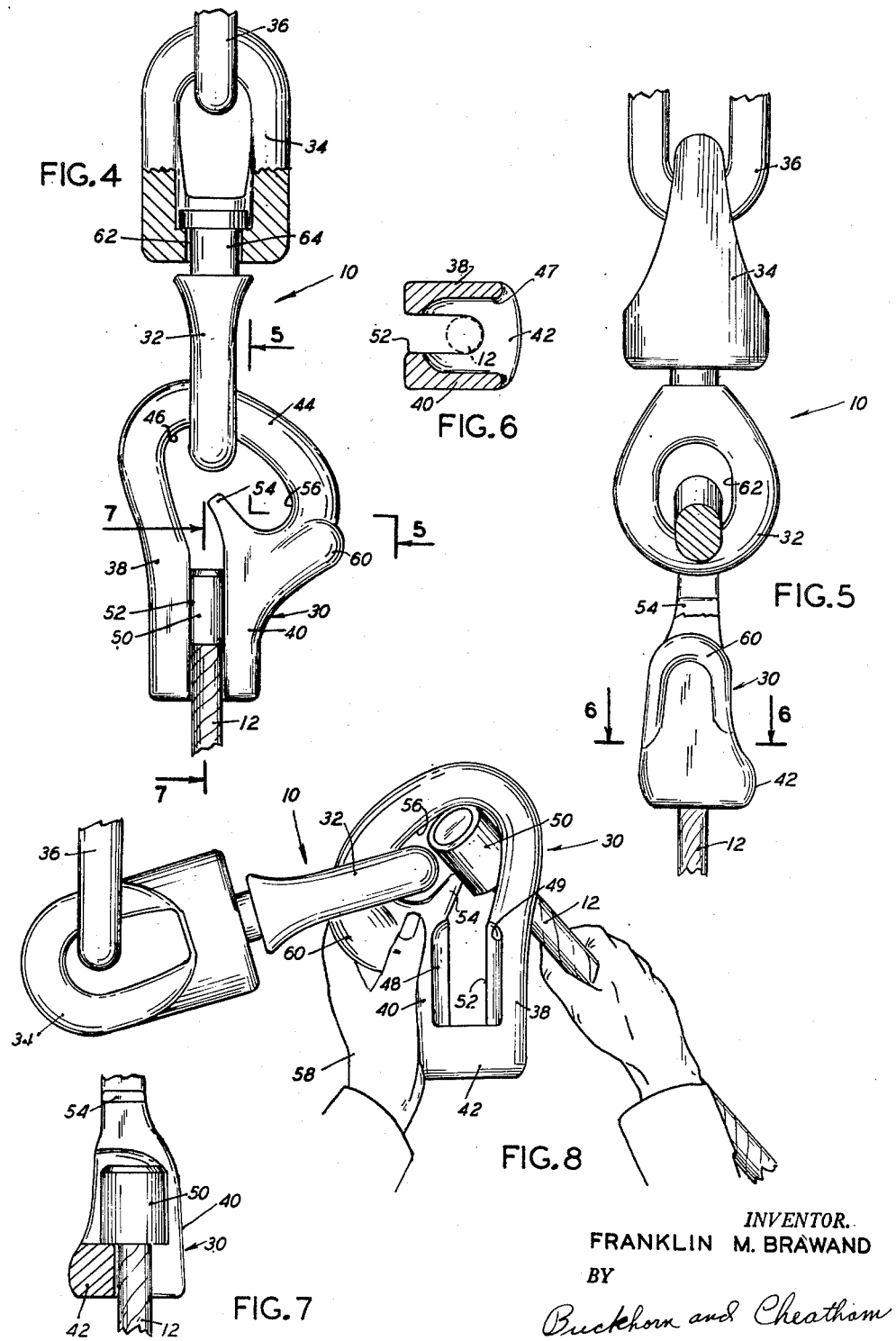
INVENTOR.
FRANKLIN M. BRAWAND
BY
Buckhorn and Cheatham
ATTORNEYS

United States Patent Office 2,759,234
Patented Aug. 21, 1956

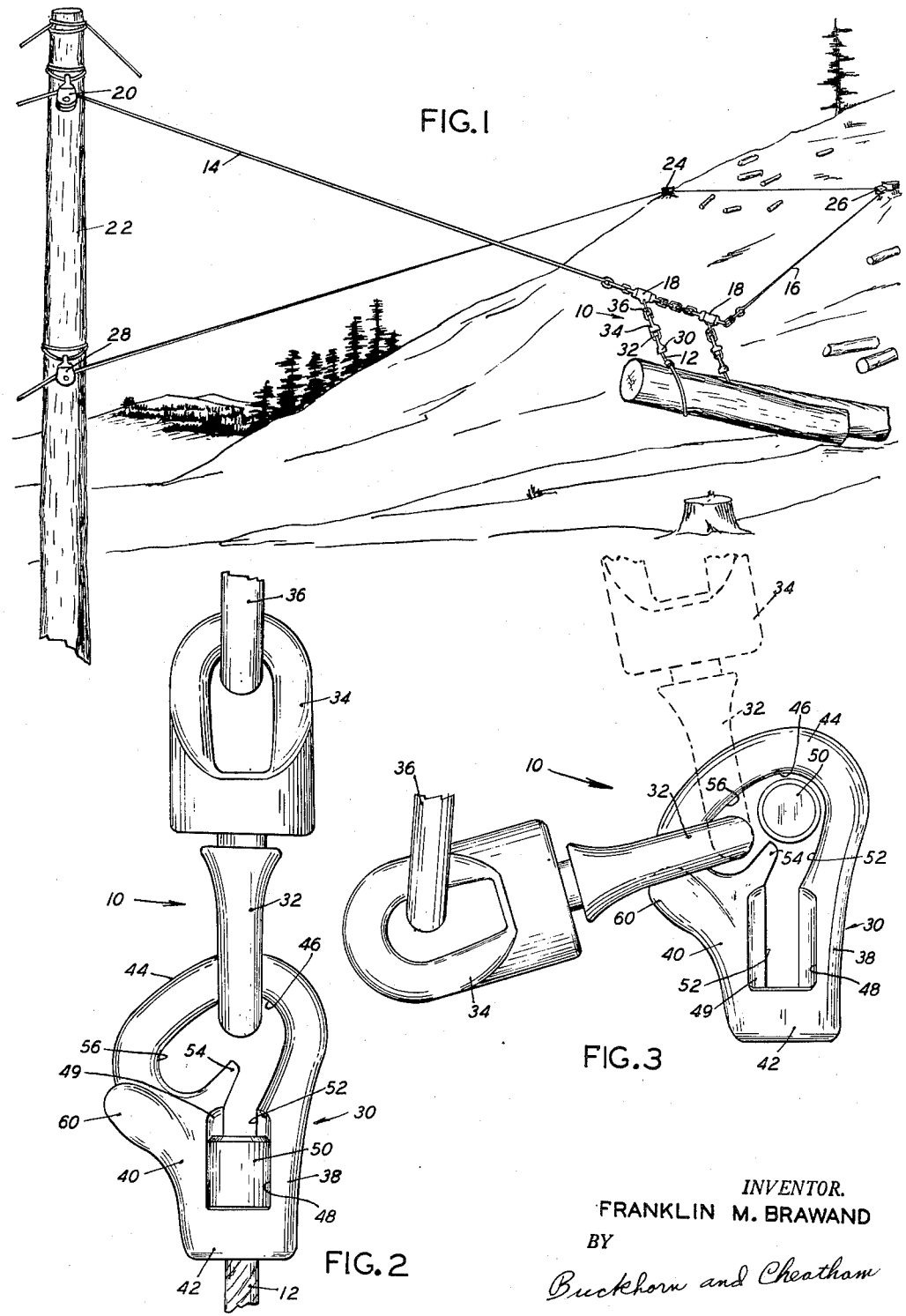

2,759,234

BUTT CHAIN ASSEMBLY WITH MEANS FOR PREVENTING ACCIDENTAL DETACHMENT THEREOF

Franklin M. Brawand, Portland, Oreg.

Application June 24, 1955, Serial No. 517,721

2 Claims. (Cl. 24—123)

This invention relates to a butt chain assembly for logging operations, and more particularly to such an assembly which can be made of a minimum number of parts nonremovably joined to each other, including an improved butt hook of high mechanical strength which enables a choker cable having a ferrule thereon to be rapidly connected to and disconnected from the hook and which provides safety features which guard the user against injury when connecting or disconnecting the choker cable and also safety features which prevent the choker cable from being accidentally disconnected from the hook.

Butt chain assemblies including a butt hook are employed in various logging operations, for example, in "high lead" or "skyline" yarding operations, to detachably connect one end of choker cables to the main logging line, the other end of the choker cables being looped about logs which are being brought to a central position or yard. A choker cable is looped about one or more logs near the point where the logs have been felled and the free end of the choker cable having a ferrule thereon is then connected to the butt hook. When the log or logs have been brought to the yard, the choker cable is disconnected from the butt hook and removed from the log or logs. While being transported to the yard, the logs are dragged along the ground in the case of high lead yarding or may be carried through the air in the case of skyline yarding. In any case, the butt chain assembly is subjected to high stresses and must be of high mechanical strength. Also, the butt hook should be safe to use and should provide for quick connection and disconnection of the choker cable. It is also important that the choker cable remain attached to the butt hook at all times when logs are being handled; i. e., the butt hook should be such that the choker cable does not become accidentally disconnected therefrom.

In accordance with the present invention, an improved butt chain assembly is provided which contains essentially three elements only, a two-part swivel and a single-part butt hook, all preferably formed by casting them with interengaging parts so that the elements cannot be detached from each other without destruction. The butt hook, furthermore, has provision for detachably receiving a ferrule on the end of a choker cable, and also has provision for preventing the choker cable from being accidentally detached, as well as provision for protecting the user against accidental injury when attaching and detaching the choker cable. The swivel has a lower eye and the butt hook is provided with a bail passing through such eye. In its normal operating position, the lower eye of the swivel obstructs a passage in the bight of such bail through which the ferrule on the choker cable must pass when the choker cable is being connected or disconnected. In order to connect or disconnect the choker cable, the butt hook must be lifted by the user so that the lower eye of the swivel moves from its normal position into a notch provided by the bail of the butt hook and out of the passage referred to. Accidental slacking of the rigging while the butt hook is being lifted to connect or disconnect a cable may cause the swivel to fall or scissor against the side of the hook. The hook of the present invention, however, is provided with an enlargement adjacent the notch above referred to, which enlargement limits the scissoring swivel relative to the butt hook, thus preventing pinching or crushing of the hand of the user.

It is therefore an object of the present invention to provide an improved butt chain assembly in which the essential parts are nondetachably connected together and in which a minimum number of parts are required.

Another object of the invention is to provide a butt chain assembly including an improved butt hook which provides for quickly connecting and disconnecting the end of a choker cable but which prevents accidental disconnection of the choker cable from the hook when the hook is in use.

Another object of the invention is to provide an improved butt hook which enables the end of a choker cable to be quickly connected or disconnected from the hook, and which also prevents injury to the hands of the user of the hook.

Other objects and advantages of the invention will appear in the following description thereof given in connection with the attached drawings of which:

Fig. 1 is a perspective view illustrating one use of the butt chain assembly of the present invention;

Fig. 2 is a side elevation showing one side of the essential parts of the butt chain of the present invention with the choker cable connected to the butt hook;

Fig. 3 is a view similar to Fig. 2 showing the position of the parts when the choker cable is being connected or disconnected;

Fig. 4 is a side elevation showing the other side of the butt chain of the present invention, with portions broken away to show the swivel construction;

Fig. 5 is a rear elevation of the butt chain, partly in section, taken along the line 5—5 of Fig. 4;

Fig. 6 is a horizontal cross section taken on the line 6—6 of Fig. 5;

Fig. 7 is a fragmentary sectional view taken on the line 7—7 of Fig. 4; and

Fig. 8 is a view similar to Fig. 3 showing the ferrule of the choker cable in a different position and illustrating how the hand of the user is protected from injury when connecting or disconnecting the choker cable.

The butt chain assembly of the present invention may be employed in a variety of ways in logging operations, and for purposes of illustration a so-called "high lead" rigging is shown in Fig. 1. In order to simplify the drawings, much of the auxiliary rigging, such as the pass line and the block therefor and the strawline and the block therefor, has been omitted and only the main logging line and haul back line with associate blocks shown. The butt chains 10 of the present invention are employed to connect choker cables 12, each looped around one or more logs to the main line 14 and to the haul-back line 16, the butt chains being usually connected to swivels 18 in a chain connected between the main line and the haul-back line. The main line 14 passes through a high lead block 20 secured near the top of a spar tree 22 and continues to a power drum on a donkey engine (not shown). The main line is employed to drag the logs along the ground to the yard. The haul-back line 16 passes through a tail block 24 and a corner or side block 26 and a haul-back lead block 28, also secured to the spar tree 22, to another power drum on the donkey engine. It will be appreciated that the logging equipment, including the butt chain assembly 10, is subjected to high stresses when the logs encounter obstructions and that the choker cable should not become disengaged from the butt chain under any possible conditions encountered.

The butt chain 10 is shown in Figs. 2 to 8, inclusive, and includes a butt hook 30 and a butt chain swivel made up of a lower eye 32 and an upper eye 34. The butt chains may be attached to the swivels 18 (Fig. 1) of the main and haul-back lines with any suitable connecting members 36. The butt hook 30 is in the form of a closed link having a front portion 38 and a rear portion 40 connected together at their lower ends by a bottom portion 42 to provide a body portion. The front and rear portions 38 and 40, respectively, are also connected together at their upper ends by a bail 44 providing a bight 46 and linking with the lower eye 32 of the butt chain swivel. The front and rear portions of the butt hook are recessed at one side of the hook to provide a ferrule socket 48 extending longitudinally of and having an opening 49 through one side of the body of the butt hook, and also having flat front and rear walls provided by the front and rear portions 38 and 40 and a flat bottom wall provided by the bottom portion 42. A choker ferrule 50 is received in the socket 48 through the opening 49 in the side of the body of the hook, the ferrule being secured to an end of the choker cable 12.

The front and rear portions 38 and 40 of the hook also provide a curved wall at the other side of the body of the hook through which a cable slot 52 extends, the slot being of less width than the diameter of the ferrule 50 and of somewhat greater width than the diameter of the cable 12. The slot 52 extends throughout the longitudinal extent of the body portion of the hook, and from the other side of the hook part way through the bottom portion 42 so as to enable the ferrule to assume the position shown in Figs. 2, 4, and 7 with the cable 12 extending coaxially of the socket from the lower end of the hook. The front and rear portions 38 and 40 also provide a curved top wall for the socket 48 and the slot 52 extends entirely through such top wall and into the bight 46 of the bail. The bail has upwardly diverging front and rear portions and is asymmetric in form, the rear portion of the bail diverging to a greater extent than the front portion, but has its top portion formed so that the uppermost portion of the bight 46 is directly above the center of the socket 48 and in axial alignment with such socket. A tongue 54 projects upwardly from the rear portion 40 of the body of the hook to provide a laterally and downwardly extending notch 56 in the bight of the bail adjacent the rear portion thereof, the notch 56 being separated from the slot 52 by the tongue 54. The slot 52 extends in an upwardly inclined direction along the front portion of the bail, the tongue 54 being inclined so as to have its side adjacent the slot 52 substantially parallel to the front portion of the bail 44.

To connect the choker cable 12 to the butt hook 30, the ferrule 50 on the choker cable must first be inserted through the bight 46 of the bail 44. It is apparent from Figs. 2 and 3 that, as long as the lower eye 32 of the swivel occupies the operating position shown in such figure, the passage for the ferrule 50 through the bight 46 is obstructed, and it is only when the lower eye 32 of the swivel assumes a position such as either the solid-line or dotted-line position shown in Fig. 3 that clearance is provided for the ferrule 50. That is to say, the hook 30 must be lifted to cause the eye 32 to drop into the notch 56 before the ferrule 50 can be passed through the bight 46. After the ferrule 50 has been inserted through the bight 46, the cable 12 can be passed downwardly through the slot 52 in a manner indicated in Fig. 8 so that the ferrule 50 enters the ferrule socket 48 and comes to rest in the position shown in Figs 2, 4 and 7.

When the hook 30 is lifted to cause the lower eye 32 of the swivel to drop into the notch 56, accidental slacking of the rigging may cause the swivel to fall against the body portion of the hook. The swivel and other elements of the butt chain are made up of heavy cast steel, and the hand 58 employed to lift the butt hook may be injured by the falling swivel unless such swivel is prevented from reaching the hand. For this purpose the rear portion 40 of the body of the butt hook 30 is provided at its upper end with a lateral enlargement 60 adjacent the notch 56, which enlargement is of greater width than the opening 62 (Fig. 5) in the lower eye 32 of the swivel. The enlargement 60 effectively prevents the swivel from falling substantially below the position shown in Fig. 8, thus preventing pinching or crushing of the hand 58 of the user of the butt chain.

In order to disconnect the choker cable 12 from the butt hook, the operation described above must be reversed. That is to say, the butt hook 30 must be again lifted in order to cause the lower eye 32 of the swivel to fall into the notch 56. The cable 12 is then lifted upwardly through the slot 52 and tipped so as to move the ferrule 50 out of the ferrule socket 48 through the opening 49 in the side of the socket, after which the cable is moved further upwardly through the slot 52 until the ferrule assumes the position shown in Fig. 3. The ferrule 50 then may be drawn through the bight 46 of the bail. It will be apparent from Figs. 2 and 4 that not only must the butt hook be lifted but that the ferrule 50 must be positioned relative to the hook so that the cable 12 extends substantially perpendicular to the side of the hook and perpendicular to its normal position when connected to the hook before the ferrule can be passed through the bight 46 of the bail. There is, therefore, substantially no likelihood of the ferrule 50 being withdrawn from the butt hook 30 unless the butt hook is deliberately manipulated to cause the lower eye 32 of the swivel to fall into the notch 56, and the cable 12 and ferrule 50 then deliberately manipulated so that the ferrule is aligned with the bight 46 of the bail and withdrawn therethrough.

All elements of the butt chain of the present invention are preferably made of cast steel, and the fabrication is preferably such that a unitary chain made up of the butt hook 30 and the eyes 32 and 34 of the swivel is produced such that these elements cannot be detached from each other except by destruction. This is accomplished by first separately casting both the butt hook 30 and the upper eye 34 of the swivel and then casting the lower eye 32 with its eye portion threading the bight 46 of the bail 44 of the butt hook and its pivot portion 64 (Fig. 4) in position in a pivot aperture 66 in the lower portion of the eye 34. Sufficient clearance, for example, one-fourth inch, may be provided between the pivot portion 64 and the walls of the aperture 66 so that the aperture 66 as well as the upper and lower surfaces of the portions of the upper eye 34 surrounding the aperture 66, may be lined with molding sand to provide a hollow mold portion having the shape of the pivot portion 64 of the lower eye 32. That is to say, a layer of molding sand approximately one-fourth inch thick may be applied both in the interior of the aperture 66 and to the upper and lower faces of the portion of the upper eye 34 through which the aperture extends. The resulting hollow mold portion is properly incorporated into a mold structure having further hollow mold portions with shapes corresponding to the remaining portions of the lower eye 32 and with a portion of the hollow mold passing through the bight of the bail 44 of the butt hook 30. Molten steel is poured into the resulting mold cavity and, after the molding sand has been removed, an assembly is produced in which the three parts thereof, namely, the upper swivel eye 34, the lower swivel eye 32 and the butt hook 30 are nondetachably connected together.

I claim:

1. A butt chain comprising a supporting eye and a butt hook supported thereby, said butt hook including a body having top and bottom portions and a choker cable ferrule holding socket extending axially of said body, said body having an opening through one side thereof into said ferrule socket through which said ferrule can be passed and also having a cable slot of lesser width than the width of said ferrule socket extending into said socket through said top portion and through the other side of said body to provide for positioning said ferrule in said socket with said cable extending axially from said bottom portion, an integral bail having side portions which diverge from each other and extend upwardly from said top portion on opposite sides of said slot, said bail being linked with said supporting eye, a tongue extending upwardly from said top portion into the bight of such bail at the juncture of one side of said bail with said top portion, said tongue being inclined toward the other side of said bail and having one side forming with said other side of said bail a continuation of said slot extending upwardly above said top portion and inclined toward said other side of said bail, the space within the bight of said bail between said bail and the top of said tongue being just large enough to permit passage of said ferrule through said bail when said ferrule has its axis extending from front to rear of said body and is aligned with said space, said space being obstructed by the portion of said supporting eye linked with said bail when said hook is supported by said eye, said one side of said bail being spaced from the other side of said tongue to provide a notch on said other side of said tongue for receiving said portion of said eye when said hook is lifted relative to said eye to provide for releasing said cable from said hook by lifting said hook relative to said eye and then moving said cable relative to said hook to a position extending rearwardly of said hook and also moving said cable through said inclined slot and thereafter passing said ferrule through said bight of said bail.

2. A butt chain comprising a supporting eye and a butt hook supported thereby, said butt hook including a body having top and bottom portions and a choker cable ferrule holding socket extending axially of said body, said body having an opening through one side thereof into said ferrule socket through which said ferrule can be passed and also having a cable slot of lesser width than the width of said ferrule socket extending into said socket through said top portion and through the other side of said body to provide for positioning said ferrule in said socket with said cable extending axially from said bottom portion, an integral bail having side portions which diverge from each other and extend upwardly from said top portion on opposite sides of said slot, said bail being linked with said supporting eye, a tongue extending upwardly from said top portion into the bight of such bail at the juncture of one side of said bail with said top portion, said tongue being inclined toward the other side of said bail and having one side forming with said other side of said bail a continuation of said slot extending upwardly above said top portion and inclined toward said other side of said bail, the space within the bight of said bail between said bail and the top of said tongue being just large enough to permit passage of said ferrule through said bail when said ferrule has its axis extending from front to rear of said body and is aligned with said space, said space being obstructed by the portion of said supporting eye linked with said bail when said hook is supported by said eye, said one side of said bail being spaced from the other side of said tongue to provide a notch on said other side of said tongue for receiving said portion of said eye when said hook is lifted relative to said eye to provide for releasing said cable from said hook by lifting said hook relative to said eye and then moving said cable relative to said hook to a position extending rearwardly of said hook and also moving said cable through said inclined slot and thereafter passing said ferrule through said bight of said bail, said hook having a hand guarding enlargement extending forwardly and rearwardly therefrom below said notch to prevent said link from falling against said hook.

References Cited in the file of this patent
UNITED STATES PATENTS 2,490,218     Kirby _____ Dec. 6, 1949

FOREIGN PATENTS 36,448     Sweden _____ July 16, 1913